United States Patent [19]

Mavridis

[11] Patent Number: 5,716,650
[45] Date of Patent: Feb. 10, 1998

[54] MULTILAYER MODULAR EXTRUSION DIE

[75] Inventor: Harilaos Mavridis, Blue Ash, Ohio

[73] Assignee: Black Clawson Sano Inc., Amelia, Ohio

[21] Appl. No.: 759,453

[22] Filed: Dec. 5, 1996

Related U.S. Application Data

[63] Continuation of Ser. No. 427,239, Apr. 24, 1995, abandoned.

[51] Int. Cl.⁶ .......................... B29C 47/26; B29C 47/06
[52] U.S. Cl. .................. 425/131.1; 264/171.27; 264/173.16; 425/133.1; 425/133.5; 425/192 R; 425/462
[58] Field of Search .................. 264/171.26, 171.27, 264/173.16; 425/131.1, 133.1, 133.5, 461, 462, 192 R, 191

[56] References Cited

U.S. PATENT DOCUMENTS

| | | | |
|---|---|---|---|
| 2,820,249 | 9/1958 | Colombo | 425/132.1 |
| 3,026,565 | 3/1962 | Bonner | 425/380 |
| 3,122,788 | 3/1964 | Lieberman | 425/206 |
| 3,146,495 | 9/1964 | Sanford | 425/380 |
| 3,241,503 | 3/1966 | Schaefer | 107/1 |
| 3,308,508 | 3/1967 | Schrenk | 425/133.1 |
| 3,321,803 | 5/1967 | Corbett | 425/133.1 |
| 3,418,687 | 12/1968 | Albert | 425/133.1 |
| 3,649,143 | 3/1972 | Papesh et al. | 425/114 |
| 3,689,192 | 9/1972 | Upmeier | 425/467 |
| 3,802,826 | 4/1974 | St. Eve | 425/462 |
| 3,809,515 | 5/1974 | Farrell | 425/133.1 |
| 3,890,083 | 6/1975 | St. Eve | 425/462 |
| 3,932,102 | 1/1976 | Rosenbaum | 425/466 |
| 4,042,661 | 8/1977 | Cook | 264/173 |
| 4,111,630 | 9/1978 | Shiomi et al. | 425/462 |
| 4,167,383 | 9/1979 | Murakami et al. | 425/462 |
| 4,182,603 | 1/1980 | Knittel | 425/133.1 |

(List continued on next page.)

OTHER PUBLICATIONS

"New Die Design Combines The Best Of Spider, Spiral Features" by Kevin M. Cooney, Mold & Die Corner—PM&E Aug. 1990.
"Improving Quality of Polyolefin Films By Die Design", by B. Procter, Modern Plastics—Jan. 1973, pp. 86–88.
"Modular Blown Film Dies—How They Stack Up", By Joseph Ogando, Plastics Technology, Feb. 1994, pp. 44–48.
"Stackable, Modular File Die Cuts Residence Times, Boosts Flexibility" by Davis–Standard, Pawcatuck, Conn., PW New Analysis—Plastics World/Jan. 1993, p. 10.
"Flexible Die Allows Fast Layer Changes", by Battenfeld Gloucester Engineering, Gloucester. Mass.; Plastics World, May 1993, p. 13.
"Air Conveyor Solves 'Sticky Bottle' Proelbm", PW News Analysis—Plastics World; May 1993, p. 14.

Primary Examiner—Duane S. Smith
Attorney, Agent, or Firm—Biebel & French

[57] ABSTRACT

An extrusion die is disclosed including a first member having a surface which includes a plurality of spiral channel segments formed therein and a second member having a surface which includes a plurality of spiral channel segments formed therein. The surfaces of the first and second members are positioned with respect to each other to form a leakage gap therebetween, wherein the spiral channel segments of the first and second members are mated to form a plurality of discrete spiral channels having spiral centerlines which serpentine back and forth across the leakage gap. A spiral channel is formed by a spiral channel segment in the first member aligned with a spiral channel segment in the second member, where the depths of the respective spiral channel segments are substantially 90° out of phase. The respective spiral channel segments have a plurality of interconnected spiral channel segment portions which each gradually increase in depth from their surface to a maximum depth point and thereafter decrease in depth back to such surface.

11 Claims, 6 Drawing Sheets

U.S. PATENT DOCUMENTS

| | | | |
|---|---|---|---|
| 4,185,954 | 1/1980 | Murakami et al. | 425/462 |
| 4,201,532 | 5/1980 | Cole | 425/380 |
| 4,203,715 | 5/1980 | Raley et al. | 425/131.1 |
| 4,224,272 | 9/1980 | Klein | 264/209 |
| 4,268,239 | 5/1981 | Herrington, Jr. | 425/467 |
| 4,279,851 | 7/1981 | Lord et al. | 264/174 |
| 4,403,934 | 9/1983 | Rasmussen et al. | 425/192 R |
| 4,484,883 | 11/1984 | Honda et al. | 425/462 |
| 4,492,549 | 1/1985 | Rasmussen et al. | 425/131.1 |
| 4,518,343 | 5/1985 | Seiffert | 425/466 |
| 4,522,775 | 6/1985 | Briggs et al. | 425/133.1 |
| 4,578,025 | 3/1986 | Ando et al. | 425/133.1 |
| 4,626,187 | 12/1986 | Kamada | 425/131.1 |
| 4,657,497 | 4/1987 | Dehennau et al. | 425/133.1 |
| 4,687,430 | 8/1987 | Morris | 425/131.1 |
| 4,738,611 | 4/1988 | Briggs | 425/461 |
| 4,798,526 | 1/1989 | Briggs et al. | 425/113 |
| 4,832,589 | 5/1989 | Gini et al. | 264/171.26 |
| 4,846,658 | 7/1989 | McMullen | 425/197 |
| 4,889,477 | 12/1989 | Wortberg et al. | 425/133.1 |
| 4,931,237 | 6/1990 | Peelman et al. | 264/48 |
| 5,034,179 | 7/1991 | Richter | 425/133.1 |
| 5,045,254 | 9/1991 | Peelman et al. | 264/48 |
| 5,069,612 | 12/1991 | Teutsch et al. | 425/133.1 |
| 5,076,776 | 12/1991 | Yamada et al. | 425/133.1 |
| 5,262,109 | 11/1993 | Cook | 264/173 |
| 5,393,216 | 2/1995 | Teitsch et al. | 425/133.1 |

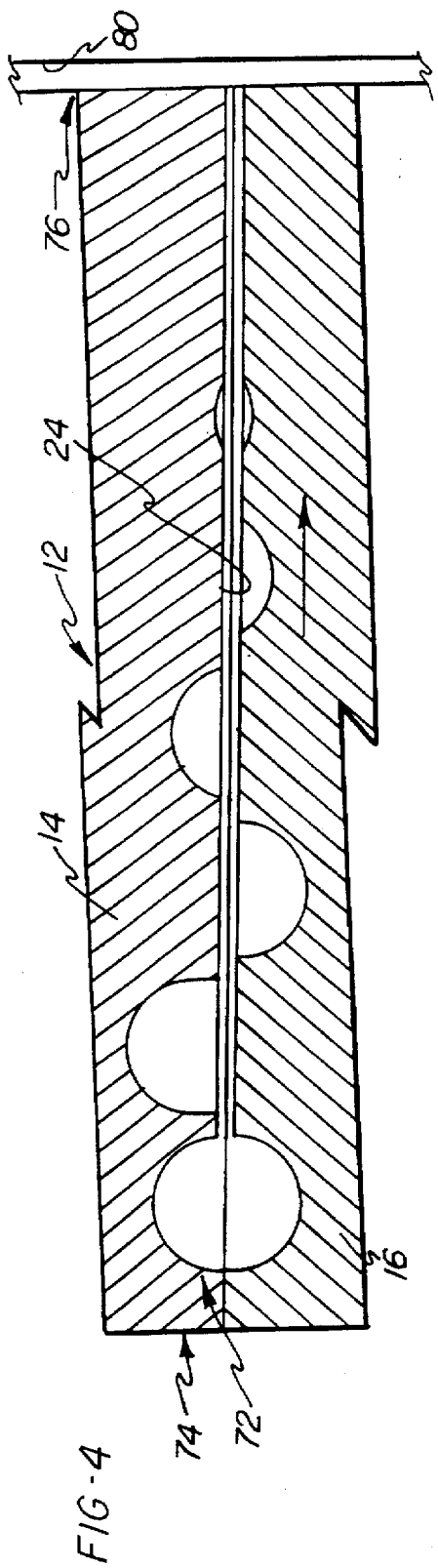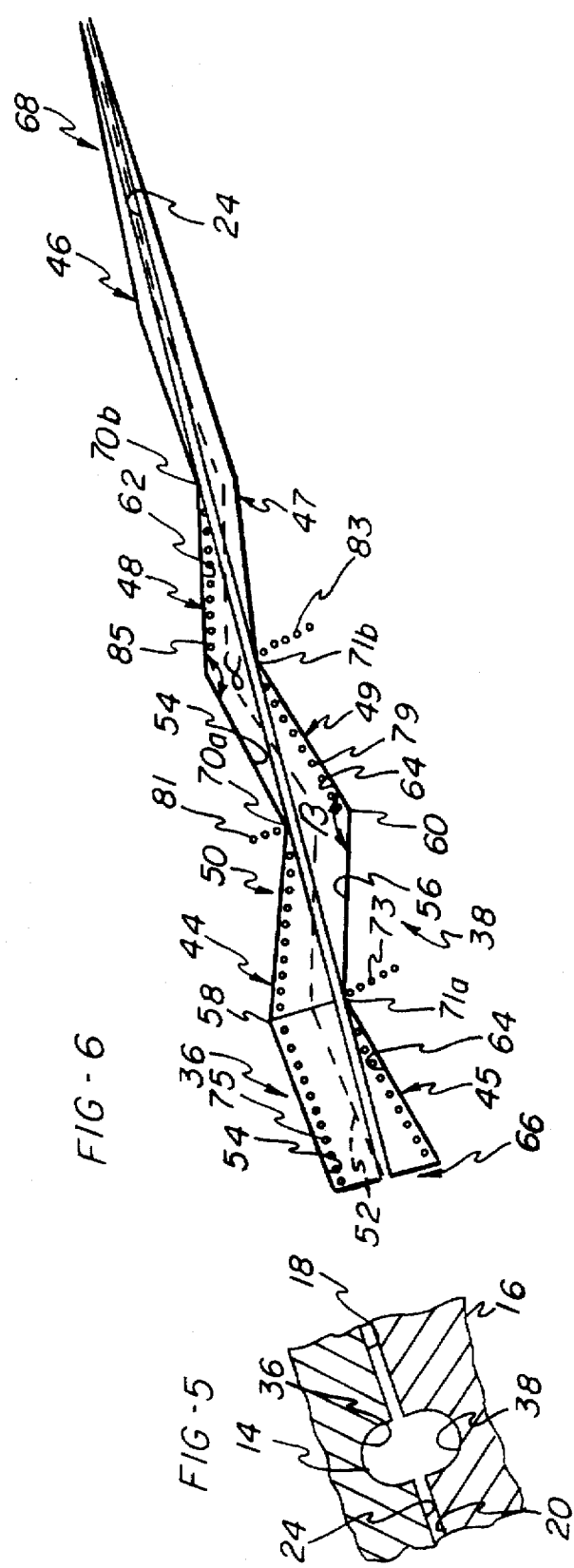

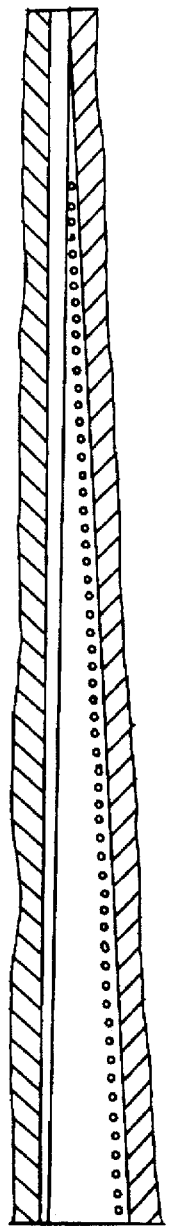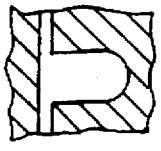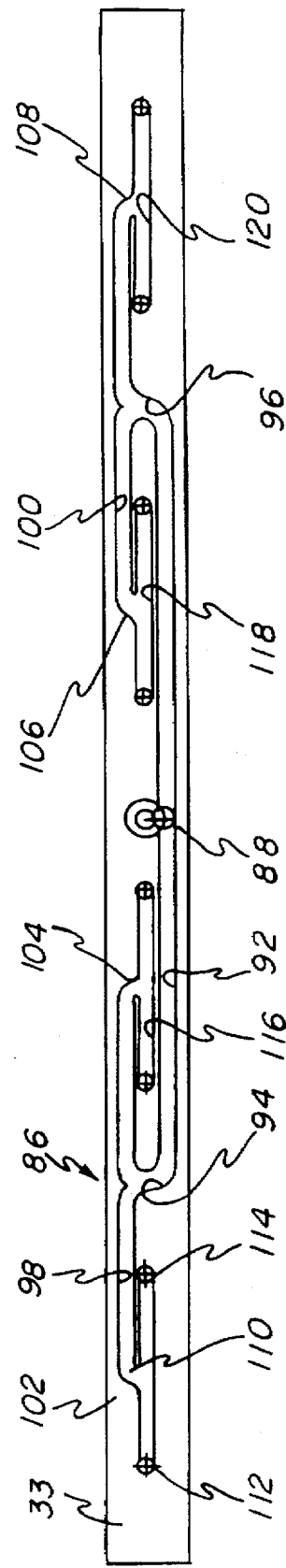

MULTILAYER MODULAR EXTRUSION DIE

This is a continuation of Ser. No. 08/427,239 filed Apr. 24, 1995, now abandoned.

BACKGROUND OF THE INVENTION

1. Field of the Invention

The present invention relates to extrusion dies utilized in blown plastic film applications and, more particularly, to extrusion dies including a unique spiral channel configuration which improves mixing and residence time distribution of material flowing therethrough.

2. Description of Related Art

Conventional extrusion dies for blown film and other annular extruded applications have generally been of the spiral mandrel type, as disclosed in U.S. Pat. No. 4,201,532 to Cole. As seen therein, a plurality of plastic feed spiral channels are cut into the inner flow surface thereof and the outer flow surface remains flat, with an overflow gap between the inner and outer flow surfaces acting as an annular passage to the annular extrusion orifice. More recently, extrusion dies having a disk or frusto-conical configuration have been utilized, particularly in stacking arrangements which permit several types of material to be joined together as a multi-layer film. Examples of this type of extrusion die are disclosed in U.S. Pat. No. 5,076,776 to Yamada et al. and U.S. Pat. No. 4,798,526 to Briggs et al. In all of these die designs, it has been well known to utilize spiral channels to promote uniformity of the various material layers, as well as better mixing of materials within each layer.

Spiral channels utilized with the various kinds of extrusion dies in the prior art generally have been formed in only one of the two flow surfaces adjacent an overflow gap therebetween (see FIG. 7). Further, such spiral channels generally have a depth which uniformly decreases from beginning to end (see FIG. 8). This spiral channel configuration promotes flow kinematics in which material at the top of such spiral channel (adjacent the die surface) flows into the overflow gap much more quickly than material flowing at the bottom of the channel. Consequently, the residence time for material flowing at the bottom of the spiral channel is much greater and leads to material degradation. Moreover, the leakage flow into the overflow gap is such that it does not involve mixing between adjacent spiral channels to a very great degree. This lack of mixing can cause one or more diagonal weld lines to be formed across the final film product, which affects its uniformity, structural integrity, and appearance.

As seen in U.S. Pat. No. 3,809,515, a stacked-type extrusion die is disclosed having spiral channels formed by mating grooves provided within both flow surfaces. In this design, the top and bottom grooves have a different radial pitch, causing the two halves of the spiral channel to move out of phase from one another. Therefore, the half-channel of one flow surface mates with part of one half-channel downstream and part of another half-channel upstream formed in the corresponding flow surface. Although the arrangement claims to promote inter-spiral mixing, the leakage through the overflow gap always comes from the middle of the spiral channel. Accordingly, material moving at the very top of the top groove and at the very bottom of the bottom groove continues moving through the spiral channel and does not participate in leakage flow until the end of the spiral channel. This leads to the same negative consequences relating to mixing and residence time uniformity as the spiral channel design formed on only one flow surface discussed above.

In light of the foregoing, it would be desirable for extrusion dies, particularly those utilized in blown plastic film applications, to include spiral channels which promote improved mixing of material between adjacent spiral channels and improved residence time uniformity of material flowing through the spiral channels. Further, it would be desirable for such extrusion dies to include spiral channels having flow kinematics where material at the top and bottom of such spiral channels is forced to participate in leakage flows into the overflow gap due to channel geometry.

SUMMARY OF THE INVENTION

In accordance with one aspect of the present invention, an extrusion die is disclosed including a first member having a surface which includes a plurality of spiral channel segments formed therein and a second member having a surface which includes a plurality of spiral channel segments formed therein. The surfaces of the first and second members are positioned with respect to each other to form a leakage gap therebetween from an entry end to an exit end, wherein the spiral channel segments of the first and second members are mated to form a plurality of spiral channels having centerlines which serpentine back and forth across the common leakage gap. The extrusion die may be of the disk-type design, wherein the first member is an upper die plate with a lower surface having the plurality of spiral channel segments formed therein and the second member may he a lower die plate with an upper surface having the corresponding plurality of spiral channel segments formed therein. Alternatively, the first member may he a central mandrel with a cylindrical outer surface having the plurality of spiral channel segments formed therein and the second member would then he a cylindrical die body surrounding the central mandrel with an inner surface having the corresponding plurality of spiral channel segments formed therein.

In accordance with a second aspect of the present invention, each spiral channel is composed of a spiral channel segment formed in a surface of the first member aligned with a spiral channel segment formed in the abutting surface of the second member. Each of the spiral channel segments of the first and second members have a plurality of interconnected spiral channel segment portions, including at least an inlet spiral channel segment portion and an end spiral channel segment portion. The interconnected spiral channel segment portions of the spiral channel segments gradually increase in depth from the respective surface to a maximum depth point and thereafter gradually decrease in depth back to the respective surface. The interconnected spiral channel segment portions also have a substantially arcuate cross-section in a plane transverse thereto, with the spiral channels having a substantially cylindrical cross-section in a plane transverse to the centerline thereof. The maximum depth point of each succeeding interconnected spiral channel segment portion diminishes from the inlet spiral channel segment portion to the end spiral channel segment portion, thereby causing the cross-sectional area of each spiral channel to diminish from an inlet end to a terminating end.

In accordance with a third aspect of the present invention, a flow channel is formed between the first and second members by their abutting surfaces. The flow channel is defined by the leakage gap between the first and second members, as well as a cross-section across the spiral channels formed thereby. Although the width of the leakage gap between the abutting surfaces remains substantially constant, the overall depth of the flow channel decreases from the entry end of the extrusion die to the exit end.

A primary object of the present invention is to provide an extrusion die having a spiral channel configuration which improves residence time uniformity of material flowing therethrough to prevent material degradation.

It is another object of the present invention to provide an extrusion die having a spiral channel configuration which improves mixing between adjacent spiral channels to homogenize temperature and composition.

Yet another object of the present invention is to provide an extrusion die having a spiral channel configuration which has a flow pattern that promotes leakage flow across the entire channel.

Another object of the present invention is to provide a spiral channel configuration which is compatible with several extrusion die designs.

Yet another object of the present invention is to provide an extrusion die having a spiral channel configuration where material at the top and bottom of such spiral channels is forced to participate in leakage flows by virtue of the channel geometry.

Still another object of the present invention is to provide an extrusion die having a spiral channel configuration which diffuses weld lines formed by adjacent layers of material.

Another object of the present invention is to provide an extrusion die having a spiral channel configuration which promotes improved film quality for an end product having multiple layers.

These objects and other features of the present invention will become more readily apparent upon reference to the following description when taken in conjunction with the following drawing.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

FIG. 4 is an enlarged, partial cross-sectional view of a flow channel between the upper and lower die plates of a die module depicted in FIG. 1;

FIG. 5 is an enlarged, partial cross-sectional view of a spiral channel formed by the upper and lower die plates of FIGS. 2 and 3;

FIG. 6 is an enlarged, schematic cross-sectional view of a spiral channel depicting the relative depth thereof in the upper and lower die plates of FIGS. 2 and 3;

FIG. 7 is an enlarged, partial cross-sectional view of a prior art spiral channel;

FIG. 8 is an enlarged, schematic cross-sectional view of a prior art spiral channel depicting the relative depth thereof in the flow surfaces;

FIG. 9 is a schematic, cross-sectional view of a binary flow divider located in a die body of the extrusion die shown in FIG. 1.

DETAILED DESCRIPTION OF THE INVENTION

Figure 1:
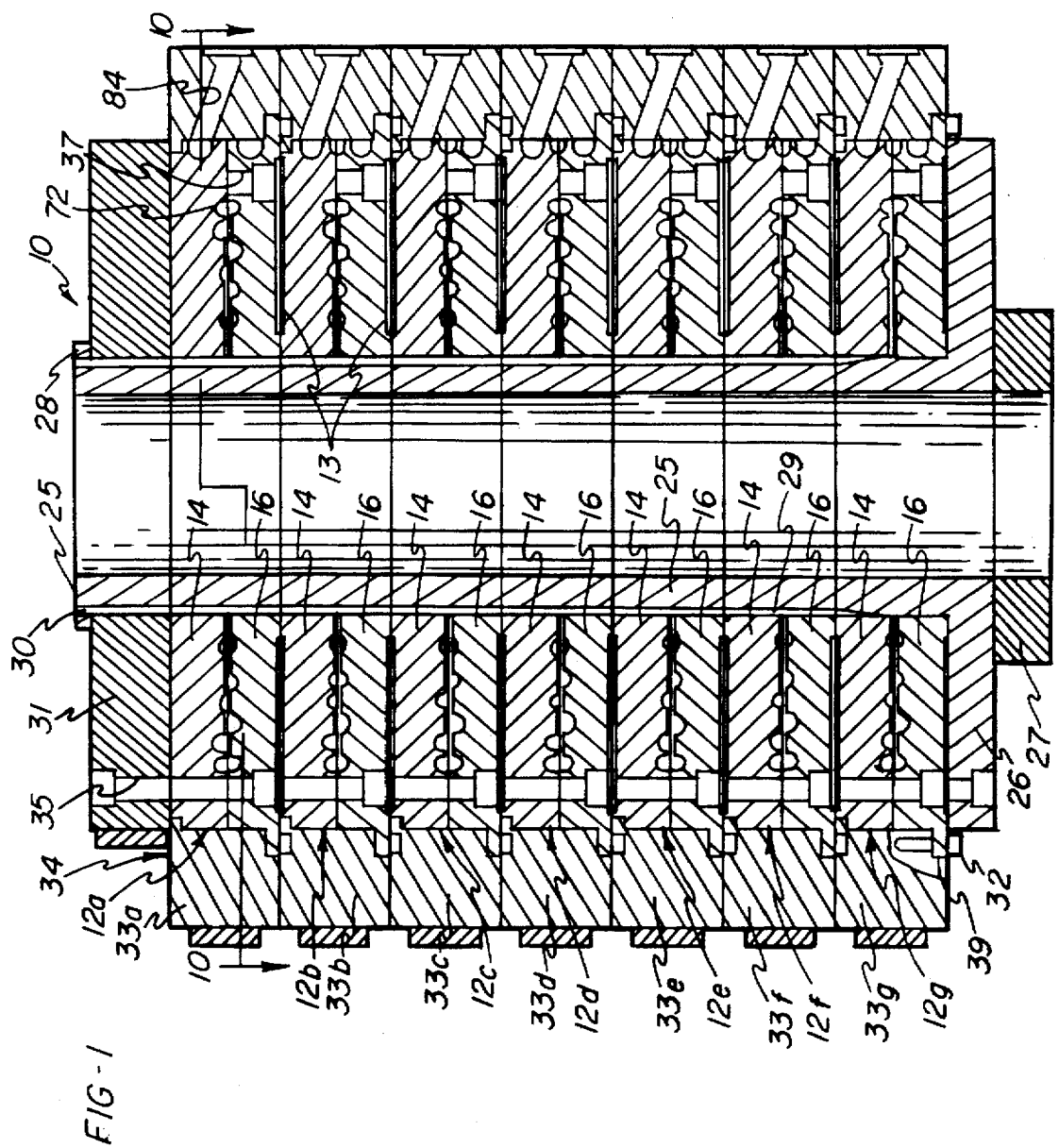
FIG. 1 is a sectional view of an extrusion die in accordance with the present invention which has a plurality of stacked disk-shaped die modules with spiral channels of a unique configuration formed therein.

Referring now to the drawings in detail, wherein identical numerals indicate the same elements throughout the figures, FIG. 1 depicts a radial feed extrusion die 10, otherwise known as an extrusion head, for use in film blowing and other annular extrudate applications. Extrusion die 10 is shown as preferably having a plurality of disk-shaped die modules 12 in a stacked arrangement and designated as die modules 12a–g. In order to provide thermal isolation between each adjacent die module 12, to allow materials of varying temperature characteristics to be utilized, an air gap 13 is provided therebetween. More specifically, it will be seen in FIGS. 1–3 that each die module 12 includes an upper die plate 14 and a lower die plate 16, where a lower surface 18 of upper die plate 14 is positioned adjacent to (or in abutting relation to) an upper surface 20 of lower die plate 16. The relationship between upper and lower die plates 14 and 16 is preferably such that a leakage gap 24 is formed therebetween (see FIGS. 4 and 5).

It will be noted that extrusion die 10 includes a hollow central mandrel 25 having a lower portion 26 below a lowermost die module 12g and an upper lip portion 28 positioned above an uppermost die module 12a. Mandrel 25 forms a common annular extrusion passage 29 with the inside surfaces of modules 12 through which the combined polymer layers move upwardly to an annular extrusion orifice 30. A lower plate member 27 is preferably located below mandrel base portion 26 to facilitate connection with an air supply (not shown) and an upper plate member 31 is located between lip portion 28 and die module 12a. It will be understood that extrusion die 10 may be configured to include any number of die modules 12 to be stacked therein, whereby a corresponding number of layers of thermoplastic material may be utilized to form the finished film product.

A corresponding number of outer die body feed modules 33 (designated as 33a–g) surround die modules 12 to form an overall cylindrical die body 34. Annular feed modules 33 include passageways by which the melt or polymer is delivered from an extruder to die modules 12, as described hereinafter.

The stacking arrangement of modules 12 and 33 in extrusion die 10 is then accomplished by fastening each outer die body feed module 33 to a die module 12 adjacent thereto by means of a fastener 32 (see outer die body feed module 33g and die module 12g in FIG. 1). Each die module 12 preferably includes an annular flange 39 extending therefrom (from lower die plate 16 in FIG. 1) to facilitate this attachment. Additionally, a plurality of bores 35 are provided (see left portion of FIG. 1 and FIG. 10) within each die module 12, lower portion 26 of central mandrel 25, and upper plate member 31 so that they may be aligned and a tie bolt or other fastening arrangement (not shown) can interconnect them. A plurality of bores 37 are also provided in die modules 12 so that a fastener (not shown) can interconnect each pair of upper and lower die plates 14 and 16 (see right portion of FIG. 1 and FIG. 10).

Figure 2:
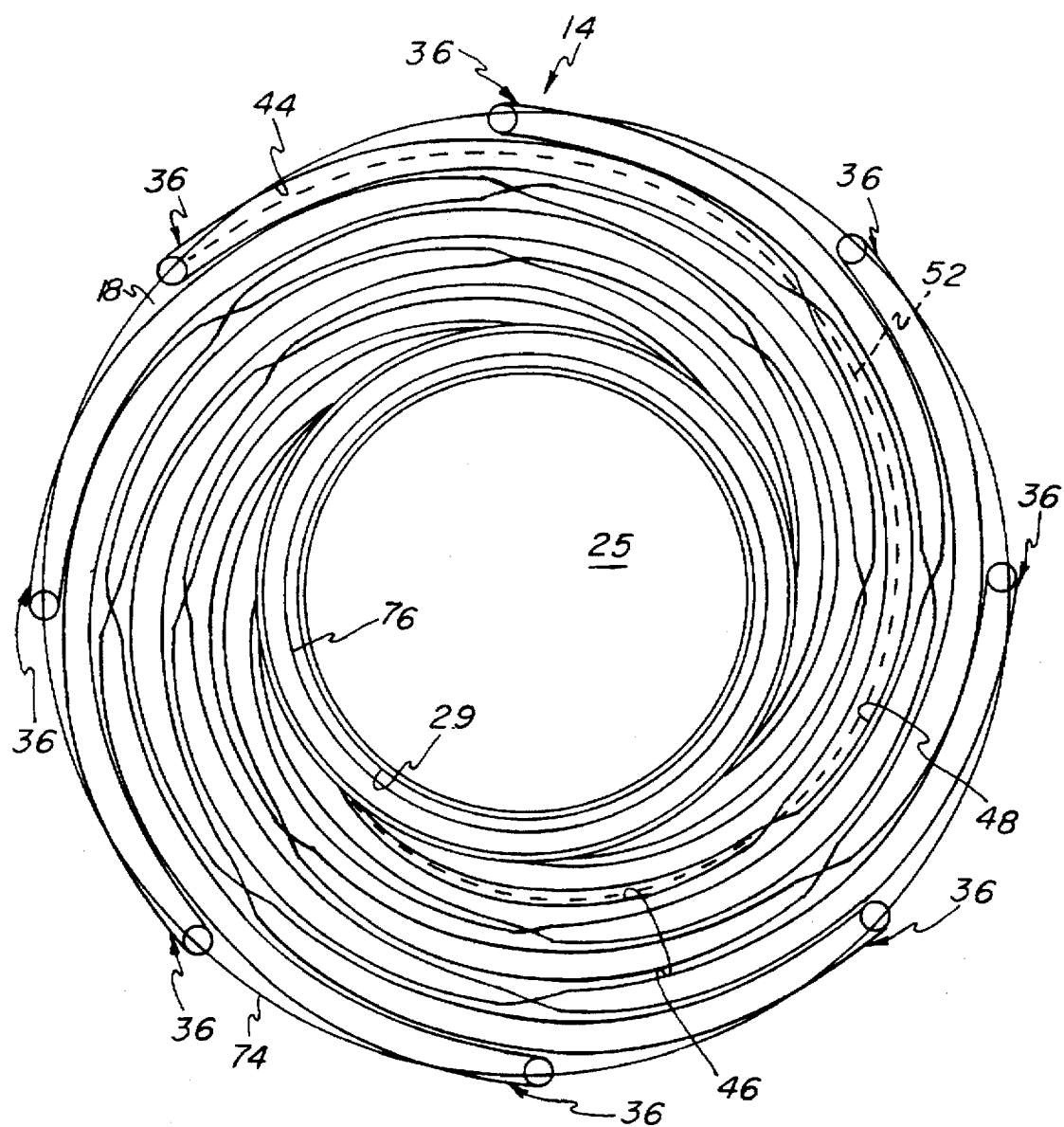
FIG. 2 is a bottom view of an upper die plate for a die module depicted in FIG. 1.
Figure 3:
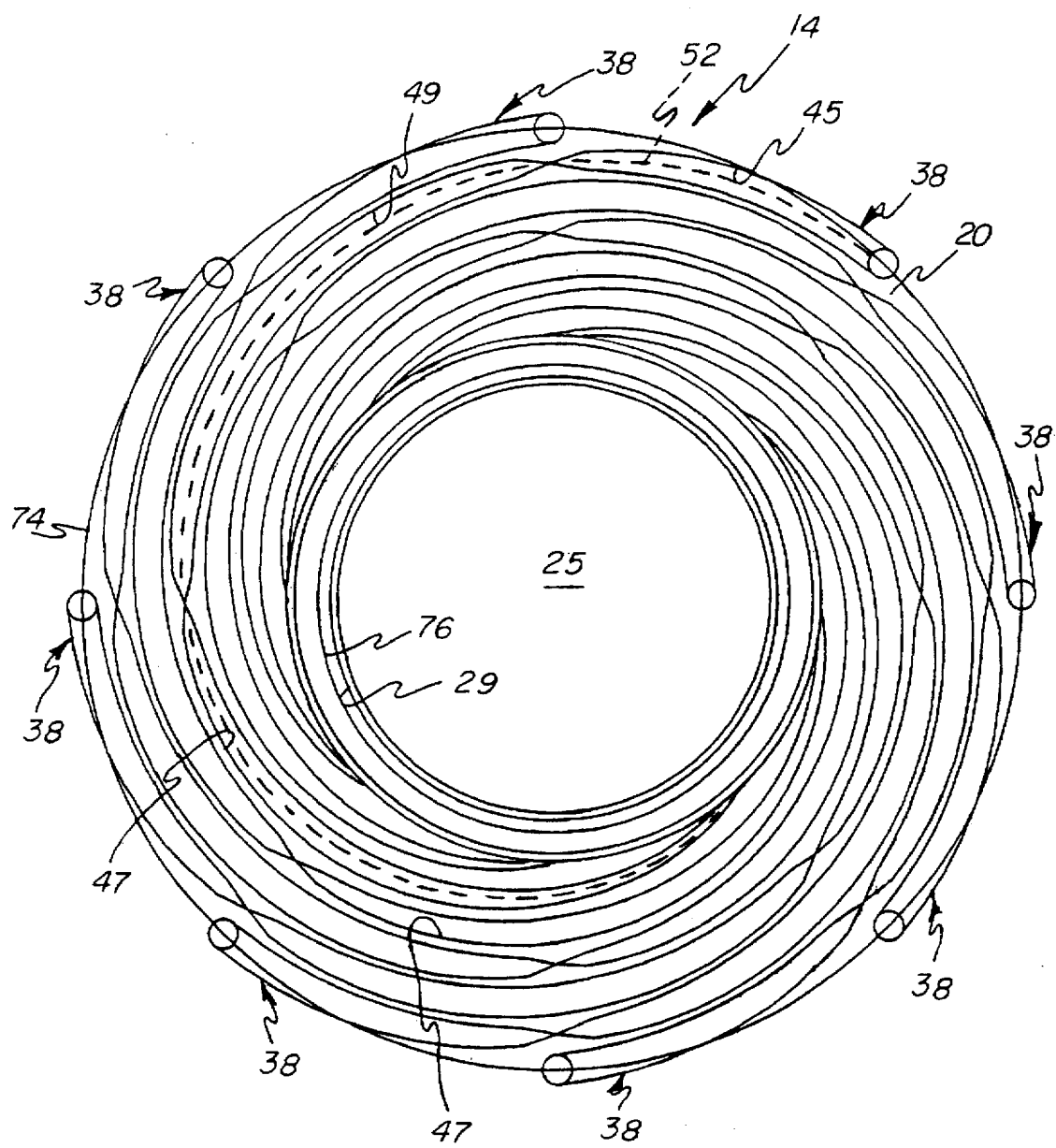
FIG. 3 is a top view of a lower die plate for a die module depicted in FIG. 1.

With respect to each die module 12, it is seen in FIG. 2 that lower surface 18 of upper die plate 14 includes a plurality of spiral channel segments 36 formed therein. Likewise, FIG. 3 depicts a plurality of spiral channel segments 38 formed in upper surface 20 of lower die plate 16. As seen therein, spiral channel segments 36 and 38 preferably have substantially the same arcuate length and are arranged with other spiral channel segments formed in their respective die plate to construct a swirling pattern. Eight separate spiral channel segments 36 and 38 are shown in FIGS. 2 and 3 with respect to upper and lower die plates 14 and 16, the inlets thereof being circumferentially spaced along an outer periphery and leading inwardly to their radially inner terminating ends. Depending upon the needs and requirements of extrusion die 10 (e.g., a desired flow rate), however, any number of spiral channel segments 36 and 38, respectively, may be provided.

It will be noted that each spiral channel segment 36 has a plurality of interconnected spiral channel segment portions, including at least an inlet spiral channel segment portion 44 and an end spiral channel segment portion 46. Preferably, one or more intermediate spiral channel segment portions 48 are provided therebetween. Likewise, each spiral channel segment 38 has a plurality of interconnected spiral channel segment portions including at least an inlet spiral channel segment portion 45 and an end spiral channel segment portion 47, as well as one or more intermediate spiral channel segment portions 49 therebetween. Although spiral channel segments 36 and 38 are each shown as including three spiral channel segment portions in FIGS. 2 and 3, any number of interconnected spiral channel segment portions may be utilized for desired residence times of material therein and the frequency of periodic leakage by material flowing along the channel surface into a flow channel described in detail herein.

Most importantly, when upper die plate 14 and lower die plate 16 are positioned so that lower surface 18 and upper surface 20 are adjacent each other, a plurality of spiral channels 50 are produced in which centerlines 52 thereof serpentine above and below leakage gap 24 between upper and lower die plates 14 and 16 (as best seen in FIG. 6), giving spiral channels 50 a wavy configuration. It will be understood that each spiral channel 50 is defined by a matched pair of spiral channel segments 36 and 38 in upper and lower die plates 14 and 16, respectively.

The wavy design of spiral channels 50 is accomplished by both the design of spiral channel segments 36 and 38, as well as their relationship to each other. As depicted in FIGS. 5 and 6, each interconnected spiral channel segment portion of spiral channel segments 36 and 38 has a substantially arcuate cross-section of varying size in a plane transverse thereto. Accordingly, each interconnected spiral channel segment portion of spiral channel segments 36 and 38 gradually increases in depth along a first arcuate surface 54 and 56, respectively, to a maximum depth point 58 and 60. Thereafter, a second arcuate surface 62 and 64 for each spiral channel segment portion of gradually decreasing depth extends from maximum depth points 58 and 60 to lower surface 18 and upper surface 20, respectively.

It will be seen in FIG. 6 that an included angle $\alpha$ exists between first arcuate surface 54 and second arcuate surface 62 and an included angle $\beta$ exists between first arcuate surface 56 and second arcuate surface 64. Preferably, angles $\alpha$ and $\beta$ increase between succeeding interconnected spiral channel segment portions of spiral channel segments 36 and 38 from inlet spiral channel segment portions 44 and 45 to end spiral channel segment portions 46 and 47. Maximum depth points 58 and 60 for succeeding interconnected spiral channel segment portions preferably decrease from inlet spiral channel segment portions 44 and 45 to end spiral channel segment portions 46 and 47. Therefore, it will be understood that each spiral channel 50 decreases in cross-sectional area from inlet spiral channel segment portions 44 and 45 to end spiral channel segment portions 46 and 48.

In order for spiral channels 50 to have the desired wavy design, each matched pair of spiral channel segments 36 and 38 is preferably substantially 90° out of phase (depth-wise). It is seen in FIG. 6 that maximum depth points 58 and 60 of spiral channel segments 36 and 38 are not in alignment, but rather are positioned across from a high point of the opposite die plate, known as leakage points 70 and 71, located between adjacent spiral channel segment portions. This is accomplished by varying the arcuate lengths of interconnected spiral channel segment portions for spiral channel segments 36 and 38.

In particular, the arcuate lengths of the interconnected spiral channel segment portions for spiral channel segments 36 preferably decrease in arcuate length from inlet spiral channel segment portion 44 to intermediate spiral channel segment portion 48 and then from intermediate spiral channel segment portion 48 to end spiral channel segment portion 46. With respect to the corresponding interconnected spiral channel segment portions for spiral channel segments 38, the arcuate length preferably increases from inlet spiral channel segment portion 45 to intermediate spiral channel segment portion 49 and then from intermediate spiral channel segment portion 49 to end spiral channel segment portion 47. It will be understood that this is only one design for accomplishing the wavy design of spiral channels 50 and is not meant to limit the scope of the invention.

As seen in FIG. 4, a flow channel 72 is formed between the opposed surfaces of upper and lower die plates 14 and 16 from an outer perimeter 74 to an inner perimeter 76 of die module 12. It will be seen that flow channel 72 is defined by leakage gap 24 between upper and lower die plates 14 and 16, which opens radially inwardly into annular extrusion passage 29, as well as a cross-section across the plurality of spiral channels 50. It is preferred that the width of leakage gap 24 between upper and lower die plates 14 and 16 remain substantially constant, although the overall depth of flow channel 72 preferably decreases from outer perimeter 74 to inner perimeter 76. Although not shown, it will be understood that leakage gap 24 may increase in size between inner and outer perimeters 76 and 74, with the direction of increase being the same as the flow direction.

The cross-section across spiral channels 50 inherently includes the cross-section of several spiral channel segments 36 and 38 in upper and lower die plates 14 and 16, which occurs at varying positions in the arcuate lengths thereof (and therefore has varying depths). As depicted in FIG. 4, this includes cross-sections across both spiral channel segments at outer and inner perimeters 74 and 76 (in order to promote symmetrical flow of material into and out of flow channel 72) and alternating cross-sections of spiral channel segments 36 and 38 therebetween.

As stated previously, leakage points 70 and 71 are high points of spiral channel segments 36 on lower surface 18 of upper die plate 14 and spiral channel segments 38 on upper surface 20 of lower die plate 16, respectively, which are located between each adjacent spiral channel segment portion of spiral channel segments 36 and 38. For example, as seen in FIG. 6, leakage points 70a and 71a are located between inlet spiral channel segment portions 44 and 45 and intermediate spiral channel segment portions 48 and 49, and leakage points 70b and 71b are located between end spiral channel segment portions 46 and 47 and intermediate spiral channel segment portions 48 and 49. It is at leakage point 70 that a portion of the material flowing along arcuate surfaces 54 and 62 and at leakage point 71 that a portion of the material flowing along arcuate surfaces 56 and 64 is forced to flow into flow channel 72, which is substantially transverse to the direction of flow through spiral channel 50. The flow kinematics of material through spiral channels 50 is produced by the V-shaped configuration of each spiral channel segment portion, where the material flows from the surface of the die plate to the maximum depth point and then back to the die plate surface. Therefore, the maximum residence times for material within each interconnected spiral channel segment portion is substantially uniform and prevents the degradation of material occurring in prior spiral channel designs.

More specifically, it will be understood from the diagrammatic depiction in FIG. 6 that since the material flowing through spiral channel 50 is a viscous material (e.g., a polymer melt), it will have laminar flow characteristics. As seen therein, a portion 73 of material 75 flowing through inlet spiral channel segment portions 44 and 45 exits into flow channel 72 at leakage point 71a. Material 75 continues along first arcuate surface 54 of inlet spiral channel segment portion 44 to maximum depth point 58 and then second arcuate surface 62 of inlet spiral channel segment portion 44. Thereafter, a portion 79 of material 75 flows into intermediate spiral channel segment portion 49 and a portion 81 flows into flow channel 72 at leakage point 70a. Material 79 is directed toward second arcuate surface 64 of intermediate spiral channel segment portion 49 of spiral channel segment 38, which causes material 79 to flow to upper surface 20 of lower die plate 16. A portion of material 83 flows into flow channel 72 at leakage point 71b and a portion 85 continues toward second arcuate surface 62 of intermediate spiral channel segment portion 48 of spiral channel segment 36. This process continues throughout each spiral channel segment portion until any remaining material at terminating end 68 of spiral channel 50 is then finally forced into flow channel 72. Accordingly, material entering flow channel 72 occurs across the entire length of spiral channels 50, with leakage from material flowing adjacent arcuate surfaces 54, 56, 62 and 64 occurring periodically at leakage points 70 and 71. It should also be noted that material flowing into flow channel 72 mixes with other material flowing through adjacent spiral channels located radially inward of spiral channel 50. This mixing between adjacent spiral channels promotes diffusion of weld lines, which may be prevented completely if sufficient mixing takes place.

Returning now to FIG. 1, it will be recalled that extrusion die 10 includes center mandrel 25 extending through die modules 12a–g and die body 34 so that an annular extrusion passage 29 is produced between center mandrel and inner perimeter 76 of die modules 12a–g to annular extrusion orifice 30. A plurality of openings 82 are provided at an outer circumferential portion of upper and lower die plates 14 and 16 for each die module 12 (see FIG. 10), wherein material is encouraged to flow through upper and lower die plates 14 and 16 to annular extrusion passage 29. Feed openings 82 of die modules 12 are in flow communication with a feed nozzle 84 within die body 34 as described below.

Figure 10:
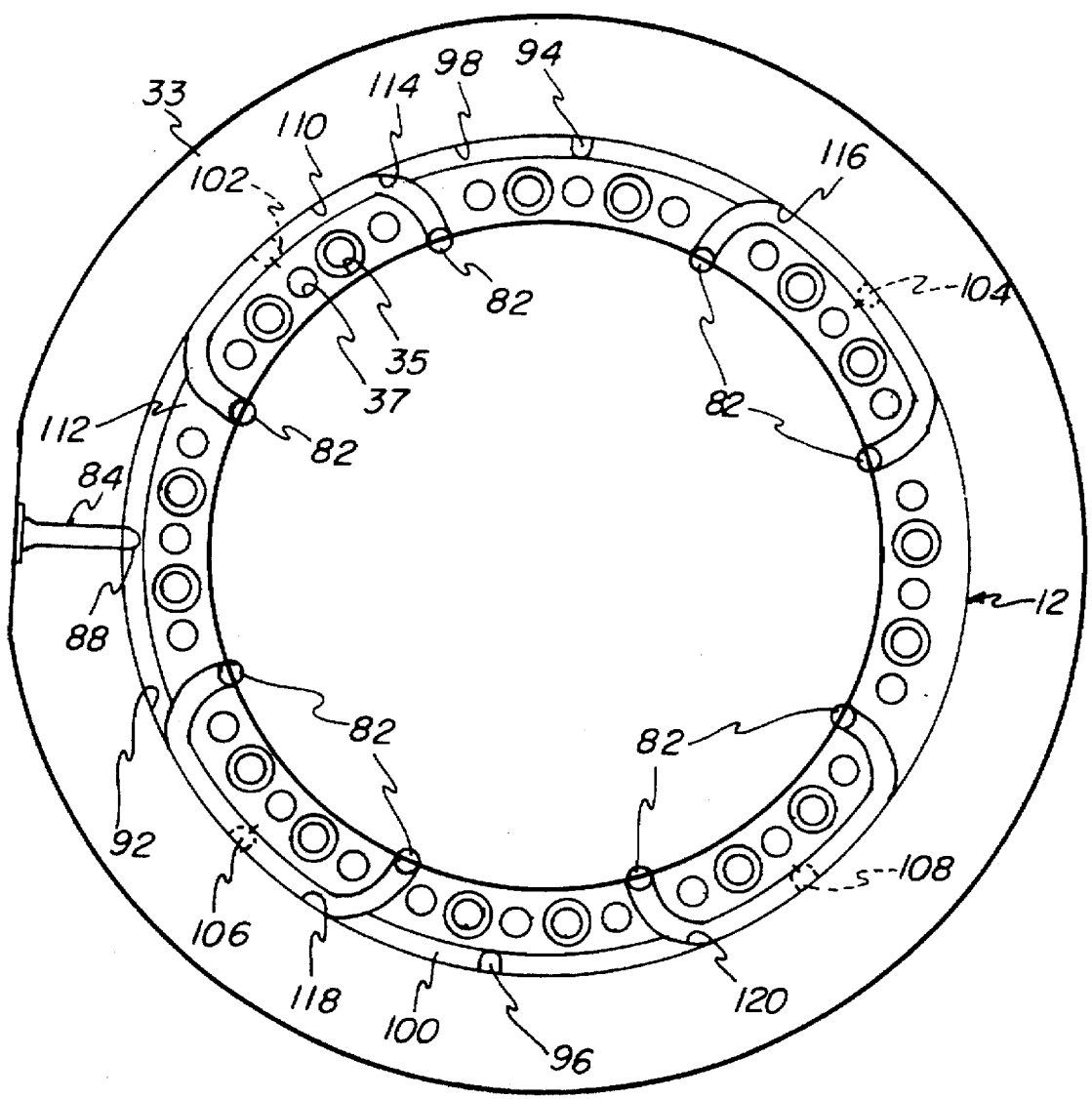
FIG. 10 is a view taken along line 10—10 in FIG. 1, where the spiral channels have been omitted for clarity.

In order to promote equal path length distribution of material through die modules 12, and thereby promote a uniform thickness of material in the layers of the finished film product, a network 86 of passages for feeding material to die module openings 82 is provided. As best seen in FIGS. 9 and 10, network 86 includes a single inlet 88 connected to feed nozzle 84 and a plurality of radial exit passages in which each one is in flow communication with one of die module openings 82. The configuration of network 86 is such that the distance between network inlet 88 and each die module opening 82 is substantially equal.

More specifically, it will be understood that network 86 of passages includes a first arcuate passage 92 in flow communication with network inlet 88 where first arcuate passage 92 extends approximately one-quarter the circumference of die block module 12 from inlet 88 in each direction. A first connector passage 94 and a second connector passage 96 are in flow communication with the ends of first arcuate passage 92, with first and second connector passages 94 and 96 being oriented substantially perpendicular to first arcuate passage 92 and positioned in directly opposite relation to each other across die module 12 (see FIG. 10). It will be noted that the transition between first arcuate passage 92 and first and second connector passages 94 and 96, as with the transition between all passages in network 86, is radiused to promote proper flow therebetween.

A second arcuate passage 98 is provided in flow communication with first connector passage 94, wherein second arcuate passage 98 extends approximately one-eighth the circumference of die module 12 from first connector passage 94 in each direction. Likewise, a third arcuate passage 100 is in flow communication with second connector passage 96, with third arcuate passage 100 extending approximately one-eighth the circumference of die module 12 from second connector passage 96 in each direction.

A third connector passage 102 and a fourth connector passage 104 is in flow communication with the ends of second arcuate passage 98, with third and fourth connector passages 102 and 104 being oriented substantially perpendicular to second arcuate passage 98. A fifth connector passage 106 and a sixth connector passage 108 is in flow communication with the ends of third arcuate passage 100, with fifth and sixth connector passages 106 and 108 being oriented substantially perpendicular to third arcuate passage 100. It will also be noted in FIG. 10 that fourth and fifth connector passages 104 and 106 and third and sixth connector passages 102 and 108, respectively, are positioned in directly opposite relation to each other across die module 12.

A fourth arcuate passage 110 is in flow communication with third connector passage 102, wherein fourth arcuate passage 110 extends approximately one-sixteenth the circumference of die module 12 from third connector passage 102 in each direction. A pair of exit passages 112 and 114 extend radially inward from fourth arcuate passage 110 to be in flow communication with two feed openings 82 in die module 12. Likewise, a fifth arcuate passage 116, a sixth arcuate passage 118, and a seventh arcuate passage 120 are provided which are in flow communication with fourth connector passage 104, fifth connector passage 106, and sixth connector passage 108, respectively, wherein each such arcuate passage extends approximately one-sixteenth the circumference of die module 12 from its respective connector passage in each direction. A pair of exit passages (not identified) extend radially inward from the ends of fifth arcuate passage 116, sixth arcuate passage 118, and seventh arcuate passage 120 and are in flow communication with other feed openings 82 in die module 12 as with those exit passages 112 and 114 for fourth arcuate passage 110.

It will be understood that greater or fewer arcuate and connector passages may be required depending upon the number of feed openings 82 in die module 12. Accordingly, such number will also affect the circumferential length for each arcuate passage as should be understood by those skilled in the art.

Having shown and described the preferred embodiment of the present invention, further adaptations of the spiral channel design for the die modules can be accomplished by appropriate modifications by one of ordinary skill in the art without departing from the scope of the invention. In particular, while the extrusion die described herein involves a plurality of matching disk-shaped die plates, a central mandrel and surrounding die body with a leakage gap therebetween may employ the unique spiral channel design described herein. In such case, both the outer surface of the central mandrel and the inner surface of the die body will have the plurality of spiral channel segments formed therein which together comprise the spiral channels having centerlines that serpentine back and forth across the leakage gap. Further, material flowing through the extrusion die (as shown and described herein) may be either side fed or center fed into the spiral channels depending upon die design.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A die module for feeding a thermoplastic material through an extrusion die to an annular extrusion passage, said die module comprising:
    (a) an upper die plate having an upper surface and a lower surface, said lower surface including a plurality of spiral channel segments formed therein; and
    (b) a lower die plate having an upper surface and a lower surface, said upper surface including a corresponding plurality of spiral channel segments formed therein;
   wherein the lower surface of said upper die plate and the upper surface of said lower die plate are positioned with respect to each other to form a leakage gap from an entry end of said die plates to said annular extrusion passage and said spiral channel segments of said upper and lower die plates are mated in matched pairs of channel segments to form a plurality of discrete spiral channels, each said channel having a spiral centerline which serpentines above and below said leakage gap, each of said spiral channels having an inlet for receiving said thermoplastic material.

2. The die module of claim 1, wherein each of said spiral channel segments of said upper and lower die plates gradually increase in depth from said leakage gap respectively, to a maximum depth point and thereafter gradually decrease in depth with respect to said leakage gap.

3. The die module of claim 1, each of said spiral channel segments further comprising a plurality of end-to-end interconnected spiral channel segment portions, wherein each said pairs of channel segments include an inlet spiral channel segment portion located adjacent said entry end and an end spiral channel segment portion located adjacent said annular extrusion passage.

4. The die module of claim 3, each of said interconnected spiral channel segment portions having a first surface of gradually increasing depth from said leakage gap, respectively, to a maximum depth point and a second surface of gradually decreasing depth from said maximum depth point to said leakage gap.

5. The die module of claim 4, wherein an included angle is formed between said first and second surfaces of each said interconnected spiral channel segment portions, said included angle of each interconnected spiral channel segment portion in said spiral channel segment increasing from said inlet spiral channel segment portion to said end spiral channel segment portion.

6. The die module of claim 4, wherein a leakage point is defined between each adjacent interconnected spiral channel segment portion of said spiral channel segment for said upper die plate and each adjacent interconnected spiral channel segment portion of said spiral channel segment for said lower die plate, wherein flow of said thermoplastic material along said first and second surfaces flows into said leakage gap.

7. The die module of claim 6, wherein the leakage points for said upper die plate interconnected spiral channel segment portions in each said pairs of channel segments are aligned with the maximum depth points of said corresponding lower die plate interconnected spiral channel segment portions and the leakage points for said lower die plate interconnected spiral channel segment portions are aligned with the maximum depth points of said corresponding upper die plate interconnected spiral channel segment portions.

8. An extrusion die for feeding a polymer material to an extrusion orifice in annular extradate applications, said extrusion die comprising:
    (a) a plurality of die modules assembled in a stack having first and second ends to form a die body for said extrusion die, each of said die modules further comprising:
        (1) an upper die plate having an upper surface, a lower surface including a plurality of spiral channel segments formed therein, a peripheral edge defining an outer perimeter of said upper die plate extending between said upper and lower surfaces, and a central bore through said upper die plate defining an inner perimeter which provides open communication between said upper and lower surfaces; and
        (2) a lower die plate having an upper surface including a corresponding plurality of spiral channel segments formed therein, a lower surface, a peripheral edge defining an outer perimeter of said lower die plate extending between said upper and lower surfaces, and a central bore through said lower die plate defining an inner perimeter which provides open communication between said upper and lower surfaces;
    wherein the lower surface of said upper die plate and the upper surface of said lower die plate are positioned with respect to each other to form a leakage gap therebetween from said outer perimeters to said inner perimeters thereof and said spiral channel segments of said upper and lower die plates form a plurality of pairs of mated discrete spiral channels each having spiral centerlines which serpentine above and below said leakage gap;
    (b) means for retaining said die modules in position;
    (c) a center mandrel extending through the central bores of said die modules, wherein an inner annular extrusion passage is produced between said center mandrel and the inner perimeters of said die modules; and
    (d) a plurality of openings located at an outer circumferential portion of each die module, wherein material is encouraged to flow through each die module to said inner annular passage.

9. The extrusion die of claim 8, further comprising a network of passages adjacent the outer perimeter of said die modules for feeding said material to said die module openings, said network having a single inlet and a plurality of exit passages, one of said network exit passages being in flow communication with one of said die module openings, wherein the distance between said network inlet and each of said die module openings is substantially equal.

10. An extrusion die for feeding a viscous material therethrough to an extrusion passage, comprising:
    (a) a first member having a surface which includes a plurality of spiral channel segments formed therein; and (b) a second member having a surface which includes a corresponding plurality of spiral channel segments formed therein, said surfaces of said first and second members being positioned with respect to each other to form a leakage gap therebetween from an entry end to said extrusion passage;

wherein said spiral channel segments of said first and second members are mated in opposed pairs to form a plurality of discrete spiral channels, said segments varying in depth from said leakage gap to form said channels having spiral centerlines which serpentine back and forth across said leakage gap.

11. The extrusion die of claim 10, wherein said first member is an upper die plate with a lower surface having said plurality of spiral channel segments formed therein and said second member is a lower die plate with an upper surface having said plurality of spiral channel segments formed therein.

* * * * *